United States Patent [19]

Rittler

[11] Patent Number: 4,507,392

[45] Date of Patent: Mar. 26, 1985

[54] TRANSPARENT GLASS-CERAMICS OF HIGH NEGATIVE EXPANSION FOR USE AS DECORATIVE GLAZES

[75] Inventor: Hermann L. Rittler, Corning, N.Y.

[73] Assignee: Corning Glass Works, Corning, N.Y.

[21] Appl. No.: 559,625

[22] Filed: Dec. 8, 1983

[51] Int. Cl.$^3$ ............................................. C03C 3/22
[52] U.S. Cl. ........................................ 501/4; 501/21; 501/24
[58] Field of Search ............................... 501/4, 21, 24

[56] References Cited

U.S. PATENT DOCUMENTS

| | | | |
|---|---|---|---|
| 2,920,971 | 1/1960 | Stookey | 501/4 |
| 3,157,522 | 11/1964 | Stookey | 501/7 |
| 3,241,985 | 3/1966 | Kuwayama | 501/7 |
| 3,252,811 | 5/1966 | Beall | 501/4 |
| 3,282,712 | 11/1966 | Tashiro et al. | 501/7 |
| 3,484,327 | 12/1969 | Denman | 501/72 |
| 3,499,773 | 3/1970 | Petticrew et al. | 501/7 |
| 3,625,718 | 12/1971 | Petticrew | 501/7 |
| 3,677,785 | 7/1972 | Horikawa et al. | 501/69 |
| 3,779,856 | 12/1973 | Pirooz | 501/7 |
| 3,788,865 | 1/1974 | Babcock et al. | 501/7 |
| 3,928,229 | 12/1975 | Neuroth | 501/64 |
| 4,018,612 | 4/1977 | Chyung | 501/4 |
| 4,038,448 | 7/1977 | Boyd et al. | 501/23 |
| 4,093,468 | 6/1978 | Boitel et al. | 501/4 |
| 4,158,081 | 6/1979 | Wexell | 501/23 |
| 4,192,688 | 3/1980 | Babcock et al. | 501/7 |
| 4,285,728 | 8/1981 | Babcock et al. | 501/10 |

Primary Examiner—Mark Bell
Attorney, Agent, or Firm—C. S. Janes, Jr.

[57] ABSTRACT

This invention is directed to the production of glass-ceramic materials designed for application as glazes to low expansion ceramic bodies. The inventive glass-ceramics exhibit average coefficients of thermal expansion (25°–100° C.) of less than $-15 \times 10^{-7}/°C$., demonstrate excellent resistance to attack by acids and bases, contain beta-quartz solid solution as the predominant crystal phase, and consist essentially, in weight percent, of

| | |
|---|---|
| $SiO_2$ | 50–67 |
| $Al_2O_3$ | 22–32 |
| $Li_2O$ | 4.5–7 |
| $TiO_2$ and/or $ZrO_2$ | 4.5–8 |

2 Claims, No Drawings

TRANSPARENT GLASS-CERAMICS OF HIGH NEGATIVE EXPANSION FOR USE AS DECORATIVE GLAZES

BACKGROUND OF THE INVENTION

Glass-ceramics had their genesis in the U.S. Pat. No. 2,920,971. As is explained therein, the production of such articles contemplates three basic elements: (1) a glass-forming batch, customarily containing a nucleating agent, is melted; (2) the melt is simultaneously cooled to a temperature below the transformation range thereof and shaped into a glass body of a desired configuration; and (3) the glass body is exposed to a particularly-defined heat treatment which causes the growth of crystals in situ whereby the glass is converted into a predominantly and, frequently, virtually totally crystalline article.

The transformation range is generally considered to be that temperature at which a liquid melt has been transformed into an amorphous solid, that temperature commonly being deemed to reside in the vicinity of the annealing point of the glass. Where desired, as, for example, to visually inspect the glass quality of the precursor glass body, the glass melt may be cooled all the way to room temperature. Nevertheless, in the interests of production speed and energy economy, the commercial fabrication of glass-ceramics normally involves cooling the initial melt to only slightly below the transformation range and thereafter proceeding with the customary crystallization heat treatment. Frequently, the heat treatment is carried out in two steps: first, a nucleation step wherein the glass body is heated to a temperature within or somewhat above the transformation range and held for a sufficient length of time at that temperature to promote the development of nuclei and to initiate crystallization; and thereafter, second, a crystallization step wherein the nucleated body is heated to a higher temperature which at least approaches, and often exceeds, the softening point of the glass, and maintained for a sufficient length of time at that temperature to cause the growth of crystals on the nuclei.

Because of the normally highly crystalline microstructure existing in glass-ceramics, the physical properties demonstrated by such articles more nearly reflect the properties of the crystal phases present therein than the characteristics of the parent glass body. Moreover, inasmuch as the components of the crystal phase have been removed from the initial glass composition, the physical properties of whatever residual glass is left in the glass-ceramic will be quite different from those of the precursor glass. Furthermore, because crystallization is generated in situ, a glass-ceramic body manifests a geometry similar to the parent glass body and is free from voids and non-porous.

For further discussion of the preparation and qualities of glass-ceramics and the mechanism of crystal growth, reference is specifically made to U.S. Pat. No. 2,920,971.

Transparent glass-ceramic articles are known to the art. In general, the articles have displayed transparency because the crystals exhibited refractive indices very closely approximating that of the residual glass and/or demonstrated very low birefringence and/or the dimensions of the crystals were smaller than the wavelength of visible light. Examples of disclosures relating to the preparation of transparent glass-ceramics include:

U.S. Pat. No. 3,157,522 describes transparent glass-ceramics consisting essentially, in weight percent on the oxide basis, of

| $SiO_2$ | 55–75 | $Al_2O_3$ | 12–36 |
|---|---|---|---|
| $Li_2O$ | 2–15 | $TiO_2$ | 3–7 | wherein the weight ratio $Li_2O:Al_2O_3$ ranges between 0.1–0.6 and $SiO_2 + Al_2O_3 + Li_2O + TiO_2$ is at least 95%.

The crystal phase consisted of beta-eucryptite and/or beta-spodumene and the coefficients of thermal expansion are stated to be less than $10 \times 10^{-7}/°C$. (The coefficients of thermal expansion of the working examples ranged from $-9.8$ to $8.7 \times 10^{-7}/°C$.)

U.S. Pat. No. 3,241,985 is concerned with transparent glass-ceramics consisting essentially, in weight percent on the oxide basis, of

| $SiO_2$ | 65–75 | $ZrO_2$ | 2–5 |
|---|---|---|---|
| $Al_2O_3$ | 12–27 | $TiO_2$ | 0–1.8 |
| $Li_2O$ | 1.7–4.5 | | | wherein $SiO_2 + Al_2O_3 + Li_2O > 85$.

No identification of the crystal phase present is provided and the coefficients of thermal expansion of the working examples ranged from $-3$ to $14 \times 10^{-7}/°C$.

U.S. Pat. No. 3,282,712 is directed to transparent glass-ceramics consisting essentially, in weight percent on the oxide basis, of

| $ZrO_2$ | 1–4 | $SiO_2$ | 55–70 |
|---|---|---|---|
| $TiO_2$ | 1–3 | $Al_2O_3$ | 20–35 |
| $P_2O_5$ | 1–5 | $Li_2O$ | 3–5 | wherein $ZrO_2 + TiO_2 + P_2O_5 + SiO_2 + Al_2O_3 + Li_2O$ is at least 95.

Beta-eucryptite was observed to be the predominant crystal phase and the coefficients of thermal expansion of the working examples ranged from $-5$ to $-10 \times 10^{-7}/°C$.

U.S. Pat. No. 3,484,327 is drawn to transparent glass-ceramics consisting essentially, in weight percent on the oxide basis, of

| $SiO_2$ | 57–68 | $TiO_2$ | 0–6 |
|---|---|---|---|
| $Al_2O_3$ | 18–27 | $ZrO_2$ | 0–3 |
| $Li_2O$ | 3.4–4.5 | $MgO$ | 0–3 |
| $CaO$ | 0–3 | $Na_2O$ | 0–1 |
| $ZnO$ | 0–2 | $P_2O_5$ | 0–3 |
| $B_2O_3$ | 0–4 | | | wherein

| $SiO_2 + Al_2O_3$ | <82 |
|---|---|
| $SiO_2 + Al_2O_3 + B_2O_3 + P_2O_5$ | 86–91 |
| $CaO + MgO + ZnO + Na_2O$ | 2.5–6 |
| $SiO_2 + Al_2O_3 + P_2O_5 + Li_2O$ | >93 |
| $TiO_2 + ZrO_2$ | 2–6 |

Beta-eucryptite and/or beta-spodumene comprises the predominant crystal phase and the coefficient of thermal expansion is observed to range from $-10$ to $10 \times 10^{-7}/°C$.

U.S. Pat. No. 3,499,773 discloses transparent glass-ceramics consisting essentially, in weight percent on the oxide basis, of

| $SiO_2$ | 50–75 | $TiO_2$ | 0–6 |
|---|---|---|---|
| $Al_2O_3$ | 16–35 | $ZrO_2$ | 0–12 |
| $Li_2O$ | 2.5–6 | $SnO_2$ | 0–12 | wherein $TiO_2 + ZrO_2 + SnO_2$ 1.5–12.

Beta-eucryptite constitutes the predominant crystal phase and the coefficient of thermal expansion is stated to range from $-12$ to $12 \times 10^{-7}/°C$.

U.S. Pat. No. 3,625,718 discusses transparent glass-ceramics consisting essentially, in weight percent on the oxide basis, of

| $SiO_2$ | 64–74 | $TiO_2$ | 1.2–2.4 |
|---|---|---|---|
| $Al_2O_3$ | 15–23 | $ZrO_2$ | 0–2 |
| $Li_2O$ | 3.3–4.8 | $MgO$ | 0–2.5 |
| $ZnO$ | 1–3.8 | $CaO$ | 0–2.5 |

Beta-eucryptite comprises the predominant crystal phase and the coefficients of thermal expansion of the working examples range from $-13$ to $0.4 \times 10^{-7}/°C$.

U.S. Pat. No. 3,677,785 describes transparent glass-ceramics consisting essentially, in weight percent on the oxide basis, of

| $SiO_2$ | 65–75 | $MgO$ | 1.3–2 |
|---|---|---|---|
| $Al_2O_3$ | 15–25 | $BaO + MgO$ | 2.6–5 |
| $Li_2O$ | 2.5–4.5 | $ZrO_2$ | 1–2 |
| $BaO$ | 1.3–4 | $TiO_2$ | 1–2 |

The crystal phase is not identified and the coefficients of thermal expansion of the working examples range from $-6$ to $13 \times 10^{-7}/°C$.

U.S. Pat. No. 3,788,865 is concerned with transparent glass-ceramics consisting essentially, in weight percent on the oxide basis, of

| $SiO_2$ | 50–75 | $F_2$ | 0–0.2 |
|---|---|---|---|
| $Al_2O_3$ | 16–35 | Alkaline Earth Oxides | 0–4.5 |
| $Li_2O$ | 3–5.5 | $ZnO$ | 0–4 |
| $B_2O_3$ | 0–9 | $Na_2O$ | 0–2 |
| $ZrO_2$ | 0–5 | Colorant | 0.005–2 |
| $TiO_2$ | 0–10 | $ZrO_2 + TiO_2 + SnO_2$ | Not Over 10 |
| $SnO_2$ | 0–5 | $SiO_2 + Al_2O_3$ | 75–92 |
| $P_2O_5$ | 0–3 | | |

Beta-eucryptite and/or beta-spondumene comprises the predominant crystal phase and the coefficient of thermal expansion is observed to range from $-10$ to $10 \times 10^{-7}/°C$.

U.S. Pat. No. 3,928,229 is drawn to transparent glass-ceramics consisting essentially, in weight percent on the oxide basis, of

| $SiO_2$ | 50–70 | $TiO_2$ | 1–3 |
|---|---|---|---|
| $P_2O_5$ | 0–10 | $ZrO_2$ | 1–3 |
| $Al_2O_3$ | 15–30 | $As_2O_3$ | 0–2 |
| $Li_2O$ | 2–8 | $Sb_2O_3$ | 0–2 |
| $Na_2O$ | 0.2–2 | $Nd_2O_3$ | 1–8 |
| $MgO$ | 0–3 | $MgO + CaO$ | 0.5–3 |
| $CaO$ | 0–3 | $As_2O_3 + Sb_2O_3$ | 0–2 |
| $ZnO$ | 0.5–3 | | |

The crystal phase is not identified and the coefficient of thermal expansion is noted as ranging from $0.2–5 \times 10^{-7}/°C$.

U.S. Pat. No. 4,018,612 is directed to transparent glass-ceramics consisting essentially, in weight percent on the oxide basis, of

| $Li_2O$ | 2.5–3.5 | $SiO_2$ | 67–70 |
|---|---|---|---|
| $MgO$ | 1.5–2.5 | $TiO_2$ | 2–4.5 |
| $ZnO$ | 1–2 | $ZrO_2$ | 1–2 |
| $Al_2O_3$ | 17.75–20 | $BaO$ | 0–2 |

Beta-quartz solid solution constitutes the predominant crystal phase and the coefficients of thermal expansion of the working examples range from $6.8–10 \times 10^{-7}/°C$.

U.S. Pat. No. 4,093,468 relates to transparent glass-ceramics consisting essentially, in weight percent on the oxide basis, of

| $SiO_2$ | 60–70 | $TiO_2$ | 0.5–6 |
|---|---|---|---|
| $Al_2O_3$ | 15–25 | $Nd_2O_3$ | 0.03–0.75 |
| $Li_2O$ | 3–4 | $Fe_2O_3$ | Up to 0.05 |

Beta-quartz solid solution is said to comprise the predominant crystal phase and the coefficient of thermal expansion is stated to be less than $15 \times 10^{-7}/°C$.

U.S. Pat. No. 4,192,688 refers to transparent glass-ceramics consisting essentially, in weight percent on the oxide basis, of

| $SiO_2$ | 50–75 | $B_2O_3$ | 0–9 |
|---|---|---|---|
| $Al_2O_3$ | 16–35 | $P_2O_5$ | 0–3 |
| $SiO_2 + Al_2O_3$ | 75–92 | $F_2$ | 0–0.2 |
| $Li_2O$ | 3–5.5 | $RO$ | 0–4.5 |
| $ZrO_2$ | 0–5 | $ZnO$ | 0–4 |
| $TiO_2$ | 0–10 | $Na_2O$ | 0–2 |
| $SnO_2$ | 0–5 | $CaO + NiO$ | 0.005–2 |
| $ZrO_2 + TiO_2 + SnO_2$ | 2–10 | | |

Beta-eucryptite and/or beta-spodumene constitutes the predominant crystal phase and the coefficient of thermal expansion is noted as ranging between $-12$ to $10 \times 10^{-7}/°C$.

U.S. Pat. No. 4,285,728 discloses transparent glass-ceramics consisting essentially, in weight percent on the oxide basis, of

| $SiO_2$ | 56–70 | $MgO$ | 0–3 |
|---|---|---|---|
| $Al_2O_3$ | 18–27 | $Na_2O$ | 0–1 |
| $Li_2O$ | 3.4–4.5 | $P_2O_5$ | 0–3 |
| $CaO$ | 0–3 | $SiO_2 + Al_2O_3$ | At least 82 |
| $ZnO$ | 0–2 | $SiO_2 + Al_2O_3 + B_2O_3 + P_2O_5$ | 86–91 |
| $B_2O_3$ | 0–4 | $CaO + MgO + ZnO + Na_2O$ | 2.5–6 |
| $TiO_2$ | 0–6 | $SiO_2 + Al_2O_3 + P_2O_5 + Li_2O$ | Not More Than 93 |
| $ZrO_2$ | 0–3 | $TiO_2 + ZrO_2$ | 2–6 |

Beta-eucryptite and/or beta-spodumene comprises the predominant crystal phase and the coefficient of thermal expansion is asserted to range between $-10$ to $10 \times 10^{-7}/°C$.

The decoration of ceramic articles through the application of glazes has been practiced for millenia. In addition to enhancing aesthetics, however, glazes have also been employed to improve the resistance of the product from attack by comestibles and other chemical agents, and glazes have been developed having a lower coefficient of thermal expansion than that of the article to be coated such that, when the glaze is cooled to room temperature after its application, it will form a compressive surface layer on the article, thereby increasing the overall mechanical strength of the article.

Glazes have been applied to glass-ceramic articles; e.g., dinnerware marketed by Corning Glass Works, Corning, N.Y., under the trademark CENTURA ®. Those articles consisted of a body of glass-ceramic having an average coefficient of thermal expansion (0°–300° C.) of about $81 \times 10^{-7}/°C$. and a vitreous glaze exhibiting a lower coefficient of thermal expansion. The surface compression layer provided by the glaze yielded a composite body demonstrating a mechanical strength in excess of two times that of the glass-ceramic alone.

There has been the desire to develop glazes having negative coefficients of thermal expansion for application to glass, glass-ceramic, and ceramic articles having a very low or zero coefficient of thermal expansion. For example, opaque glass-ceramic culinary ware is marketed by Corning Glass Works as Code 9608 and under the trademark CORNING WARE ®, that glass-ceramic exhibiting an average coefficient of thermal expansion (0°–300° C.) of about $12 \times 10^{-7}/°C$. Also, opaque glass-ceramic sheet for use as cooking surfaces and counter tops is marketed by Corning Glass Works as Code 9617, that glass-ceramic displaying an average coefficient of thermal expansion (0°–300° C.) of about $9 \times 10^{-7}/°C$. Those products have the approximate analyses tabulated below in weight percent:

|  | 9608 | 9617 |
|---|---|---|
| $SiO_2$ | 69.5 | 66.7 |
| $Al_2O_3$ | 17.6 | 20.5 |
| $Li_2O$ | 2.7 | 3.5 |
| MgO | 2.6 | 1.6 |
| ZnO | 1.0 | 1.2 |
| $TiO_2$ | 4.7 | 4.8 |
| $ZrO_2$ | 0.2 | 0.05 |
| $As_2O_3$ | 0.9 | 0.4 |
| F | 0.03 | 0.22 |
| $Fe_2O_3$ | 0.06 | 0.035 |
| $B_2O_3$ | 0.07 |  |
| $MnO_2$ | 0.03 |  |

In Code 9608 and 9617 products the predominant crystal phase is beta-spodumene.

Therefore, one objective of considerable research has been to develop glazes having very low or negative expansion coefficients which, when applied to glass, glass-ceramic, and ceramic substrates exhibiting average coefficients of thermal expansion of less than $15 \times 10^{-7}/°C.$, will provide a durable, attractive, decorative surface compression layer thereon to significantly enhance the mechanical strength of the substrate.

Inasmuch as a very important utility for glazed bodies is in dinnerware applications where the use temperature customarily ranges between about 25°–100° C., one specific objective of the present invention is to produce chemically durable glazes which are compatible with low expansion dinnerware materials. The resulting surface compression layer yields a composite article demonstrating much more than twice the mechanical strength of the original body, plus it imparts an attractive appearance to the dinnerware coupled with excellent resistance to chemical attack.

SUMMARY OF THE INVENTION

I have found that materials exhibiting average coefficients of thermal expansion over the temperature interval of 25°–100° C. of less than $-15 \times 10^{-7}/°C.$ can be prepared as transparent glass-ceramics wherein beta-quartz solid solution constitutes the predominant crystal phase. The base compositions therefor consist essentially, expressed in terms of weight percent on the oxide basis, of:

| $SiO_2$ | 50–67 |
|---|---|
| $Al_2O_3$ | 22–32 |
| $Li_2O$ | 4.5–7 |
| $TiO_2$ and/or $ZrO_2$ | 4.5–8 |

Optional additions include up to 1% $As_2O_3$, up to 1% $WO_3$, up to 7% $P_2O_5$, up to 5% ZnO, and up to 0.5 MgO. The total of those and any other compatible oxides to modify the chemical and physical characteristics of the product, e.g., to obtain increased flow during the decoration firing treatment, will not exceed 12%.

The present glasses are crystallized in situ to bodies wherein very fine-grained beta-quartz solid solution constitutes the predominant crystal phase by firing at temperatures no higher than 950° C., preferably at about 800°–850° C. Temperatures above 950° C. hazard the conversion of beta-quartz crystals to beta-spodumene solid solution crystals. Customarily, crystallization heat treatment periods of less than one hour, conveniently about 0.5 hour, are operable. As is well recognized, crystallization occurs more rapidly at higher temperatures.

Conventional coloring agents such as CoO, $Cr_2O_3$, $Cu_2O$, $Fe_2O_3$, $MnO_2$, NiO, and $V_2O_5$ can be included in the precursor glass composition to impart various hues of coloring while maintaining transparency in the final product.

The general method for glazing a glass, glass-ceramic, or sintered ceramic body exhibiting an average coefficient of thermal expansion over the range of 0°–300° C. of less than $15 \times 10^{-7}/°C.$ utilizing the inventive materials comprises the steps of:

(a) comminuting the inventive glass-ceramic materials to very finely-divided particles [preferably passing a No. 325 United States Standard Sieve (44 microns)];

(b) mixing said glass-ceramic particles with fritted glass (very finely-divided particles preferably passing a No. 325 United States Standard Sieve) and, optionally, with a ceramic pigment;

(c) preparing a suspension or paste of said particles (preferably utilizing an organic vehicle because of the ease of subsequent removal, although water and aqueous solutions are also operable);

(d) applying said suspension or paste onto a surface of said glass, glass-ceramic, or sintered ceramic body; and (e) firing said suspension or paste at a temperature not exceeding 950° C. for a period of time sufficient to fuse said suspension or paste into a smooth layer of uniform thickness.

Because of their excellent chemical durability and high gloss, the enamel fluxes disclosed in U.S. Pat. Nos. 4,038,448 and 4,158,081 are especially desirable glass frits to be combined with particles of the inventive glass-ceramics. Where desired, the mixing together of the glass-ceramic and frit (with or without a pigment) may be undertaken in the vehicle. That is to say, a separate dry blending of the two kinds of particles is not necessary. Firing temperatures in excess of 950° C. will not generally be employed because of the transformation of the β-quartz solid solution crystals of the glass-ceramic to beta-spodumene solid solution with consequent loss of transparency. Temperatures between about 800°-950° C. will commonly be employed.

The various means for applying glazes to substrates conventional to the decorating art, such as dipping, painting, silk screening, and spraying, are equally operable here. Where a thick layer and/or intricate patterns are desired, silk screening will comprise the preferred practice. That method comprises forming a paste of triturated glass-ceramic fritted glass, and, optionally, pigments in a non-aqueous vehicle, this vehicle consisting of a silk screening oil base and a volatile solvent, screening the paste onto a substrate, and then drying and firing the paste to fuse the particles into a smooth glaze or enamel.

U.S. Pat. No. 4,038,448 describes enamel fluxes having excellent chemical durability and coefficients of thermal expansion (25°-300° C.) of about $57-70 \times 10^{-7}$/°C. which consist essentially, expressed in terms of weight percent on the oxide basis, of:

| $Li_2O$ | 0.5-3 | $TiO_2$ | 1-5 |
| $B_2O_3$ | 4-8 | PbO | 45-55 |
| $ZrO_2$ | 3-8 | $SiO_2$ | 28-38 | with, optionally, up to 8% total of additive oxides including the following in the indicated proportions of 0-4% CdO, 0-3% ZnO, 0-3% $Al_2O_3$, 0-3% $Y_2O_3$, 0-4% $Ta_2O_5$, and 0-2% $SnO_2$.

U.S. Pat. No. 4,158,081 discloses enamel fluxes essentially free of $TiO_2$ having excellent chemical durability and coefficients of thermal expansion of about $48-70 \times 10^{-7}$/°C. which consist essentially, expressed in terms of weight percent on the oxide basis, of:

| $SiO_2$ | 25-40 | $ZrO_2$ | 3-10 |
| PbO | 40-60 | $B_2O_3$ | 4-12 |
| $SiO_2$ + PbO | At least 75% | $Li_2O$ | 0.02-2 |
| $Na_2O$ + $K_2O$ | 0-2 | CdO | 0-4 |

It can be readily appreciated that the higher proportion of the inventive glass-ceramic materials employed in the glaze, the lower will be the overall coefficient of thermal expansion of the glaze.

DESCRIPTION OF PREFERRED EMBODIMENTS

Table I reports a group of exemplary glasses, expressed in terms of parts by weight on the oxide basis, illustrating the composition parameters of the instant invention. Because the sum of the individual constituents totals or closely approximates 100, for all practical purposes the values tabulated may be deemed to correspond to weight percent. The actual ingredients constituting the starting batch may comprise any materials, either oxides or other compounds, which, when melted together, will be converted into the desired oxide in the proper proportions.

The batch materials were compounded, thoroughly mixed together by dry ballmilling to aid in obtaining a homogeneous melt, and charged into platinum crucibles. The crucibles were covered, introduced into a furnace operating at about 1600° C., the batches melted for about 16 hours, and cane about 0.25" diameter hand drawn from the melt and/or the melt poured onto a steel plate to from a slab about 0.125" in thickness. The slabs were annealed at about 600° C.-650° C. Samples of the required size and geometry for testing were cut from the canes and/or slabs.

$As_2O_3$ performs its customary role as a fining agent. $WO_3$ is well-recognized for its effect upon the surface tension of glass. Therefore, its presence improves glass flow during fusion of the glass frit and the pulverized glass-ceramic.

TABLE I

|  | 1 | 2 | 3 | 4 | 5 | 6 | 7 | 8 | 9 |
|---|---|---|---|---|---|---|---|---|---|
| $SiO_2$ | 62.3 | 53.1 | 65.2 | 62.9 | 63.9 | 63.3 | 63.6 | 63.9 | 61.9 |
| $Al_2O_3$ | 26.0 | 31.0 | 22.2 | 25.8 | 25.2 | 24.8 | 25.0 | 25.1 | 24.3 |
| $Li_2O$ | 6.0 | 5.4 | 6.5 | 5.8 | 5.7 | 6.1 | 6.1 | 6.1 | 6.0 |
| $TiO_2$ | 4.8 | — | 5.2 | 4.7 | 4.6 | 4.9 | 4.9 | 4.9 | 7.9 |
| $ZrO_2$ | — | 5.0 | — | — | — | — | — | — | — |
| ZnO | — | 5.0 | — | — | — | — | — | — | — |
| $WO_3$ | 0.5 | — | 0.5 | 0.5 | 0.5 | — | — | — | — |
| $As_2O_3$ | 0.4 | 0.5 | 0.4 | 0.4 | 0.4 | 0.4 | 0.4 | — | — |

|  | 10 | 11 | 12 | 13 | 14 | 15 | 16 | 17 | 18 |
|---|---|---|---|---|---|---|---|---|---|
| $SiO_2$ | 62.0 | 61.7 | 61.4 | 60.8 | 62.0 | 62.6 | 51.1 | 51.5 | 53.7 |
| $Al_2O_3$ | 26.3 | 26.2 | 26.1 | 25.8 | 26.4 | 22.5 | 31.0 | 31.3 | 28.3 |
| $Li_2O$ | 5.9 | 5.6 | 5.3 | 4.7 | 5.9 | 6.0 | 6.0 | 6.1 | 6.4 |
| $TiO_2$ | 4.8 | 4.8 | 4.7 | 4.7 | 4.8 | 8.0 | — | 4.9 | 5.1 |
| $ZrO_2$ | — | — | — | — | — | — | 6.0 | — | — |
| ZnO | 0.2 | 0.8 | 1.6 | 3.2 | — | — | — | — | — |
| $WO_3$ | 0.5 | 0.5 | 0.5 | 0.5 | 0.5 | 0.5 | — | — | — |
| MgO | — | — | — | — | 0.1 | — | — | — | — |
| $P_2O_5$ | — | — | — | — | — | — | 5.0 | 5.8 | 6.1 |
| $As_2O_3$ | 0.4 | 0.4 | 0.4 | 0.4 | 0.4 | 0.4 | 0.8 | 0.4 | 0.4 |
| F | — | — | — | — | — | — | — | — | — |
| $B_2O_3$ | — | — | — | — | — | — | — | — | — |

|  | 19 | 20 | 21 | 22 | 23 | 24 |
|---|---|---|---|---|---|---|
| $SiO_2$ | 55.3 | 61.5 | 57.3 | 59.6 | 61.9 | 58.8 |
| $Al_2O_3$ | 25.9 | 20.0 | 22.5 | 25.3 | 26.3 | 27.4 |
| $Li_2O$ | 5.5 | 4.5 | 5.5 | 3.4 | 5.4 | 5.9 |
| $TiO_2$ | 5.5 | 4.8 | 14.7 | 4.6 | 4.8 | 5.9 |
| $ZrO_2$ | — | — | | | | |
| ZnO | — | 1.2 | — | 6.2 | — | — |
| $WO_3$ | — | — | — | 0.5 | 0.5 | — |
| MgO | — | 1.6 | — | — | 0.8 | 1.1 |
| $P_2O_5$ | 5.9 | — | | | | |
| $As_2O_3$ | 0.9 | — | — | 0.4 | 0.4 | 1.1 |
| F | — | 2.0 | | | | |
| $B_2O_3$ | — | 4.0 | | | | |

The glass canes and slabs were transformed into fine-grained, transparent glass-ceramics by being introduced into an electrically-heated furnace, the temperature therein being raised at furnace rate to that reported in Table II below, that temperature being maintained for the period of time recorded in Table II, and the crystallized bodies being cooled to room temperature by being treated within the furnace and the electric power thereto being cutoff. The average coefficient of thermal expansion ($\times 10^{-7}$/°C.) over the temperature range of 25°-100° C. was measured, utilizing methods conventional in the art.

TABLE II

| Example | Heat Treatment | Coefficient of Expansion |
|---|---|---|
| 1 | 800° C. for 0.25 hour | −19.6 |
| 1 | 800° C. for 0.5 hour | −21.2 |
| 1 | 850° C. for 0.5 hour | −28.0 |
| 1 | 850° C. for 1.25 hour | −15.4 |
| 2 | 800° C. for 0.5 hour | −15.9 |
| 3 | 900° C. for 0.5 hour | −19.9 |
| 4 | 900° C. for 0.5 hour | −16.5 |
| 5 | 900° C. for 0.5 hour | −15.7 |
| 6 | 900° C. for 0.5 hour | −16.4 |

TABLE II-continued

| Example | Heat Treatment | Coefficient of Expansion |
| --- | --- | --- |
| 7 | 950° C. for 0.5 hour | −16.8 |
| 8 | 950° C. for 0.5 hour | −16.3 |
| 9 | 900° C. for 0.5 hour | −16.3 |
| 10 | 850° C. for 0.5 hour | −18.5 |
| 11 | 850° C. for 0.5 hour | −19.5 |
| 12 | 850° C. for 0.5 hour | −29.4 |
| 13 | 800° C. for 0.5 hour | −18.6 |
| 14 | 900° C. for 0.5 hour | −17.8 |
| 15 | 850° C. for 0.5 hour | −15.1 |
| 16 | 950° C. for 0.5 hour | −15.7 |
| 17 | 900° C. for 0.5 hour | −15.6 |
| 18 | 950° C. for 0.5 hour | −18.6 |
| 19 | 850° C. for 0.5 hour | −15.6 |
| 20 | 910° C. for 0.5 hour | −13.7 |
| 21 | 900° C. for 0.5 hour | −11.0 |
| 22 | 900° C. for 0.5 hour | −10.1 |
| 23 | 850° C. for 0.5 hour | −12.4 |
| 24 | 850° C. for 0.5 hour | −10.2 |

That composition control is vital to secure the desired negative coefficient of expansion less than $-15 \times 10^{-7}/°C.$ is illustrated through a comparison of Examples 1–19 with Examples 20–24.

To study the utility of the inventive materials as glazes for coating ceramic substrates, glass of Example 1, the most preferred composition, was crystallized in situ and ground to pass a No. 325 United States Standard Sieve. Samples of those particles were blended with about 30–75% of frit of an enamel flux selected from U.S. Pat. Nos. 4,038,448 and 4,158,081 and 20–40% of a commercial screening oil medium, and the mixture silk screened onto the bottom surface of a baking dish prepared from Corning Code 9608 glass-ceramic material. The so-coated dish was fired at about 850° C. for about 0.5 hour to convert the coating to a smooth enamel film having a uniform thickness of about 0.4 mm. The fired film manifested good gloss, uniform thickness and excellent chemical durability. For ease of flow during fusion, the glass frit will normally comprise at least 10% and preferably, at least 25% by weight of the final fired glaze.

A measure of the chemical durability evidenced by the inventive glass-ceramics was determined by examining its resistance to alkaline detergents such as are employed in commercial dishwashers. In carrying out the test, weighed samples are immersed into a 0.3% by weight aqueous solution operating at 96° C. of an alkaline detergent marketed by Economics Laboratories, St. Paul, Minn., under the mark Super Soilax. The immersion is continued for 24 hours, following which the samples are withdrawn from the bath, rinsed in tap water, dried, examined visually, and re-weighed to measure any weight loss. An exposure period of 24 hours was deemed to be an accelerated equivalent to several years' actual use in food service. A weight loss of no more than about 0.02% is considered to indicate excellent resistance to detergents.

The inventive materials showed losses of less than 0.01% after exposure to that test procedure and essentially no change of gloss. Obviously, where highly decorative food service ware is desired, a very glossy surface is mandated.

To ascertain the resistance of the glass-ceramics to acids, weighed samples are immersed into an aqueous solution containing 10% by weight citric acid operating at 96° C. A weight loss of no more than 0.02% after an immersion of 24 hours is deemed to demonstrate good resistance to attack by acids. The inventive materials experienced weight losses of less than 0.01% with essentially no change of gloss.

I claim:

1. A transparent glass-ceramic material containing beta-quartz solid solution as the predominant crystal phase especially suitable for application as a decorative glaze to glass, glass-ceramic, and ceramic bodies exhibiting an average coefficient of thermal expansion (0°–300° C.) of less than $15 \times 10^{-7}/°C.$, said glass-ceramic material demonstrating an average coefficient of thermal expansion (25°–100° C.) of less than $-15 \times 10^{-7}/°C.$, excellent resistance to attack by acids and bases as evidenced by essentially no change of gloss and a weight loss of no more than about 0.02% after immersion for 24 hours at 96° C. in a aqueous solution containing 10% by weight citric acid and essentially no change of gloss and a weight loss of no more than about 0.02% after immersion for 24 hours at 96° C. in an aqueous solution containing 0.3% by weight of an alkaline detergent, and consisting essentially, expressed in terms of weight percent on the oxide basis, of

| | |
| --- | --- |
| $SiO_2$ | 50–67 |
| $Al_2O_3$ | 22–32 |
| $Li_2O$ | 4.5–7 |
| $TiO_2$ and/or $ZrO_2$ | 4.5–8 |

2. A transparent glass-ceramic material according to claim 1 also containing up to 12% total of an oxide selected from the group in the indicated proportions of up to 1% $As_2O_3$, up to 1% $WO_3$, up to 7% $P_2O_5$, up to 5% ZnO, and up to 0.5% MgO.

* * * * *